United States Patent
Szilagyi et al.

(10) Patent No.: US 12,273,244 B2
(45) Date of Patent: Apr. 8, 2025

(54) CLOSED LOOPS

(71) Applicant: Nokia Solutions and Networks Oy, Espoo (FI)

(72) Inventors: Peter Szilagyi, Budapest (HU); Csaba Vulkan, Budapest (HU)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/280,701

(22) PCT Filed: Mar. 9, 2021

(86) PCT No.: PCT/EP2021/055881
§ 371 (c)(1),
(2) Date: Sep. 7, 2023

(87) PCT Pub. No.: WO2022/188951
PCT Pub. Date: Sep. 15, 2022

(65) Prior Publication Data
US 2024/0297830 A1   Sep. 5, 2024

(51) Int. Cl.
*H04L 41/5019* (2022.01)
*H04L 41/16* (2022.01)

(52) U.S. Cl.
CPC .......... *H04L 41/5019* (2013.01); *H04L 41/16* (2013.01)

(58) Field of Classification Search
CPC . H04L 41/5019; H04L 41/16; H04L 41/5009; H04L 41/5035
See application file for complete search history.

(56) References Cited

U.S. PATENT DOCUMENTS

| | | | |
|---|---|---|---|
| 11,805,029 B2 * | 10/2023 | Claise | H04L 41/5009 |
| 2019/0372864 A1 | 12/2019 | Pignataro et al. | |
| 2020/0112490 A1 | 4/2020 | Mopur et al. | |
| 2020/0287813 A1 * | 9/2020 | Kutch | H04L 43/06 |
| 2021/0105189 A1 * | 4/2021 | Claise | H04L 41/5025 |
| 2021/0279602 A1 * | 9/2021 | Latapie | G06N 5/022 |
| 2021/0281492 A1 * | 9/2021 | Di Pietro | G06N 5/022 |
| 2022/0078072 A1 * | 3/2022 | Rayes | H04L 41/0813 |

OTHER PUBLICATIONS

Nainar et al., "Closed Loop Monitoring Framework for Service Assurance," Cisco; Updated: Jun. 21, 2021. (Year: 2021).*

(Continued)

*Primary Examiner* — Alina A Boutah
(74) *Attorney, Agent, or Firm* — McCarter & English, LLP

(57) ABSTRACT

A method for provisioning a self-learning closed loop service is provided. The method includes receiving a representation of the self-learning closed loop service, the representation including a specification of one or more automation subservices, identifying, for each automation subservice of the representation, one or more utility measurement subservices that are compatible with the respective automation subservice and deploying an instance of the self-learning closed loop service based on the identification, wherein the instance includes a pairing of each automation subservice of the self-learning closed loop service with one or more compatible utility measurement subservices.

20 Claims, 6 Drawing Sheets

(56) References Cited

OTHER PUBLICATIONS

Po et al., "A Closed-Loop and Self-Learning STEP-NC Machining System," 2014 IEEE/ASME International Conference on Advanced Intelligent Mechatronics (AIM) Besançon, France, Jul. 8-11, 2014. (Year: 2014).*

Edeline et al, "Towards a Closed-Looped Automation for Service Assurance with the DXAGENT," 2022 2nd International Workshop on Intent-based Networking, 978-1-6654-0694-9/22/$31.00 © 2022 IEEE. (Year: 2022).*

Ericsson LM, "ZSM009-1 review for final draft," ZSM(21)000016R2, European Telecommunications Standards Institute (ETSI), vol. ISG ZSM Zero touch network and Service Management, Sophia-Antipolis, France, Jan. 17, 2021, pp. 1-27.

"Zero-touch network and Service Management (ZSM)' Requirements based on documented scenarios," ETSI Group Specification, European Telecommunications Standards Institute (ETSI), vol. ZSM, No. V1.1.1., Sophia-Antipolis, France, Oct. 2, 2019, pp. 1-89.

\* cited by examiner

CLOSED LOOPS

CROSS REFERENCE TO RELATED APPLICATION

This patent application is a U.S. National Stage application of International Patent Application Number PCT/EP2021/055881 filed Mar. 9, 2021, which is hereby incorporated by reference in its entirety.

TECHNICAL FIELD

The present disclosure relates to a system and method for provisioning closed loops in a network.

BACKGROUND

In traditional control systems, closed loops (CLs) are subsystems which automatically regulate a system variable to a pre-determined point or desired value without human interaction. In other words, a closed loop monitors a variable and automatically performs an action to increase or decrease the current value of the variable to the set point, depending on whether the current value is below or above the set point, respectively.

Closed loop systems may be deployed in networks such as LTE and 5G communications networks to self-regulate variables associated to the network performance. More recently self-learning CLs that incorporate artificial intelligence and machine learning-based tools have been proposed for deployment. Self-learning CLs may be incorporated into a network for different purposes such as monitoring, analysis, decision making and optimization.

SUMMARY

It is an object of the invention to provide a method for provisioning a self-learning closed loop service.

The foregoing and other objects are achieved by the features of the independent claims. Further implementation forms are apparent from the dependent claims, the description and the figures.

According to a first aspect, a method for provisioning a self-learning closed loop service is provided. The method comprises receiving a representation of the self-learning closed loop service, the representation comprising a specification of one or more automation subservices, identifying, for each automation subservice of the representation, one or more utility measurement subservices that are compatible with the respective automation subservice and deploying an instance of the self-learning closed loop service based on the identification. The instance comprises a pairing of each automation subservice of the self-learning closed loop service with one or more compatible utility measurement subservices.

According to a second aspect, a non-transitory computer readable storage comprising program code that, when executed by a processor, provides instructions to implement the method according to the first aspect is provided.

According to a third aspect an apparatus for a network is provided. The apparatus comprises a data storage to store a plurality of automation subservices and utility measurement subservice for implementing self-learning closed loop services in the network, and an orchestration management function to receive a representation of a self-learning closed loop service, the representation comprising a specification of one or more automation subservices, identify, for each automation subservice of the representation, one or more utility measurement subservices stored in the data storage that are compatible with the respective automation subservice and deploy an instance of the self-learning closed loop service on the basis of the identification. The instance comprises a pairing of each automation subservice of the self-learning closed loop service with one or more compatible utility measurement subservices.

In a first implementation form identifying one or more compatible utility measurement subservices comprises receiving a representation of an automation subservice, the representation specifying attribute metadata of the automation subservice and identifying one or more compatible utility measurement subservices from a plurality of utility measurement subservices based on the attribute metadata of the automation subservice.

In a second implementation form the attribute metadata comprises first metadata specifying an automation objective of the automation subservice and second metadata specifying metrics associated to the automation subservice.

In a third implementation form identifying a compatible utility measurement subservice comprises identifying a utility measurement subservice having attribute metadata corresponding to the first and second metadata of the automation subservice.

In a fourth implementation form, the method comprises for each pairing of a utility measurement subservice with an automation subservice, evaluating, by the utility measurement subservice, a utility metric comprising an incident rate for the respective automation subservice, and communicating a utility measurement from the utility measurement subservice to the respective automation subservice based on the evaluation.

In a fifth implementation form the incident rate comprises a ratio of a number of negative events associated to the automation subservice to a total number of events.

In a sixth implementation form determining the utility metric comprises evaluating one or more of network, service, traffic, user and/or user equipment performance.

In a seventh implementation form deploying an instance comprises providing a deployment area and deploying the instance across the deployment area.

In an eighth implementation form the deployment area comprises one or more of a geographical region, a network slice, an area served by a vendor's equipment and/or services, an administrative region, a set of network equipment having a common version, vendor, capability and/or generation, a user equipment type and/or a set of subscribers.

In a ninth implementation form the method comprises identifying a plurality of utility measurement subservice that are compatible with an automation subservice, and selecting, from said plurality of utility measurement subservices, a subset of utility measurement subservices to pair with the automation subservice.

These and other aspects of the invention will be apparent from and the embodiment(s) described below.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION

Figure 1:
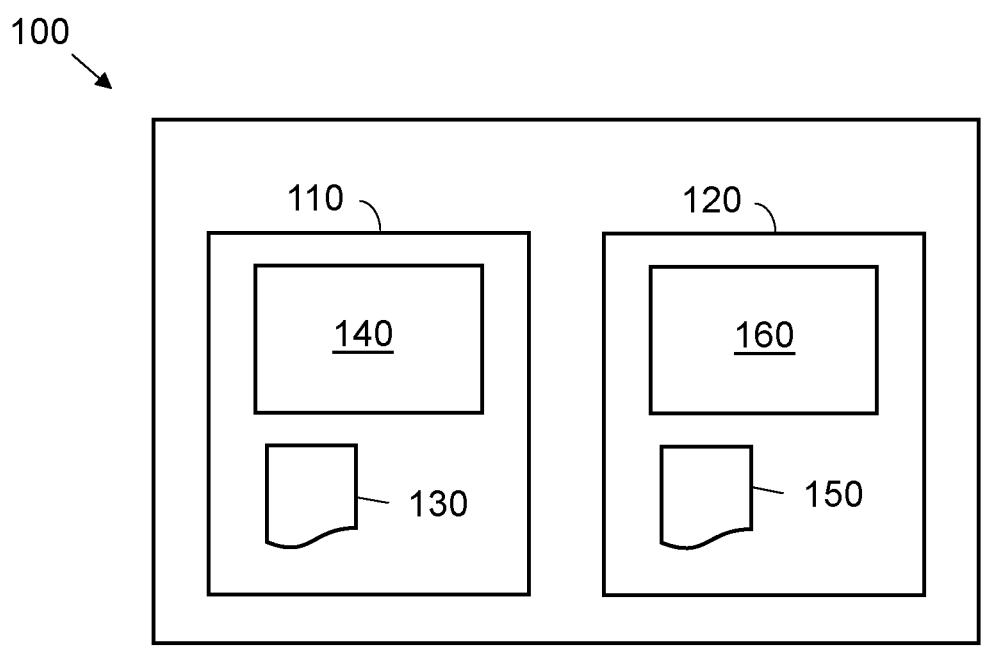
FIG. 1 shows a schematic diagram of a representation of a self-learning CL, according to an example.

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

A self-learning closed loop (CL) evaluates past actions and the consequences of those actions when making a decision on a future action. In particular a self-learning CL identifies the best action for a given context, where the best action is defined as the action that maximizes the utility of the CL to reach an objective. This self-learning capability depends on well-defined metrics that quantify the utility of the action within a given context.

In general, the logic that defines a self-learning CL will not include the logic to generate measurement data that may be used to determine the utility of an action. This is because a self-learning CL deployed in one technology domain will generally not include the logic for extracting measurements from another technology domain. For example, a self-learning CL deployed at the service layer of a network may not have access to the resource layer. However, resource layer data may be required by the self-learning CL. Further difficulties arise when multiple CLs are implemented together. For example, where multiple self-learning CLs are provided by different vendors, the CLs may need to implement similar or the same set of utility measurements on a variety of input data, where the data may also come from multiple vendors.

The methods and apparatus described herein enable realization and automated assembly of self-learning CLs. In particular, the methods and apparatus described include an architecture decomposition and related metadata and interface specification. According to the methods described herein a self-learning CL is decomposed into interworking subservices where one or more subservices implement automation logic and one or more subservices determine utility measurements.

An automation subservice may receive measurements generated by one or more utility measurement subservice and execute decisions and actions based on those measurements. Additionally, an automation subservice may produce insight or analytics that is passed on to other automation subservices. The methods described herein allow a complex distributed automation task represented by one or more self-learning CLs to be decomposed into subservices that collaboratively implement the logic of the CLs.

Herein a "subservice" may refer to a component or collection of components for a communications network that together execute a well-defined set of tasks or function. For example, a subservice may comprise network components, servers, databases, other hardware components, software and or various interfaces. In other words, a subservice is a modular or self-contained entity that may be defined and executed within the network. A representation of a subservice is a description of the subservice in terms of its components and inputs.

An "automation subservice" is a subservice that implements automation logic for a self-learning CL. According to examples, an automation logic may comprise neural networks or other forms of machine learning and artificially intelligence. In other examples automation logic may include a combination of conventional automation elements (i.e. non-learning based) with learning-based components. An automation subservice autonomously makes decisions and actions to converge a network or service towards an objective.

A "utility measurement subservice" is a reusable subservice that provide data to one or more automation subservices. According to examples a single utility measurement subservice may provide data to unrelated automation subservices across multiple self-learning CLs and vendors. A utility measurement subservice may be specialized to evaluate a network slice, a service, network traffic, user equipment or any other network or user entity state or performance from a specific perspective. The utility measurement subservice provides a standardized utility metric to automation subservices. This utility metric data may be fed back into the automation subservice to facilitate a self-learning procedure that implements the self-learning CL.

According to examples, a utility metric may be based on an incident rate. The incident rate may comprise a ratio of a number of events that are considered negative for a given outcome out of a total number of events. In this example, the definition of an event and when an event is considered negative may be defined according to an implementation of the utility measurement subservice.

FIG. 1 is a simplified schematic diagram showing a representation of a self-learning CL 100, according to an example. The example of the self-learning CL 100 may be used in conjunction with other examples described herein. The self-learning CL 100 comprises automation sub-services 110, 120. Other self-learning CLs may comprise more or fewer automation sub-services than shown in FIG. 1.

According to examples attributes of a subservice may be described in terms of attribute metadata and automation logic. In FIG. 1, the automation subservice 110 comprises the attribute metadata 130 and automation logic 140 and the automation subservice 120 comprises the attribute metadata 150 and automation logic 160.

The attributes of a subservice may include an objective and an input domain. For example, an automation subservice may be arranged to implement a service to meet a service level agreement (SLA) assurance objective or a power efficiency objective. The input domain may include types of equipment or components associated to the automation subservice from which incident measurements may be generated. In the case of a utility measurement subservice the input domain may specify data used by the utility measurement subservice to output incident measurements according to the utility metric. For example, the input domain may specify types of counters associated to specific components, network functions, infrastructure and virtual machine resource counters, application metrics etc.

According to examples, a subservice may also be associated with a deployment area attribute. The deployment area may be defined by a geographical region, a network slice, an area served by a vendor's equipment and/or services, an administrative region, a set of network equipment having a common version, vendor, capability and/or generation, a user equipment type and/or a set of subscribers, for example premium subscribers.

A further attribute related to the deployment area is the scope of a subservice. The scope of a subservice comprises the intersection of its input domain and its deployment area. The scope of a subservice is defined dynamically when the subservice is deployed in a system and may be determined by an orchestrator management function. For example, a utility measurement subservice may be arranged to generate incident data for a particular node type in a network over a specific geographical area where the node type is specified by the input domain of the subservice.

According to examples a utility measurement subservice is compatible with an automation subservice if the utility measurement subservice has common attributes with the automation subservice. For example, for an automation subservice that has an SLA assurance objective, a compatible utility measurement subservice may be arranged to generate incidents relating to the quality of service. For an automation subservice with a power efficiency objective, a compatible measurement subservice may be arranged to generate incidents based on the power consumption of the automation subservice.

Figure 2:
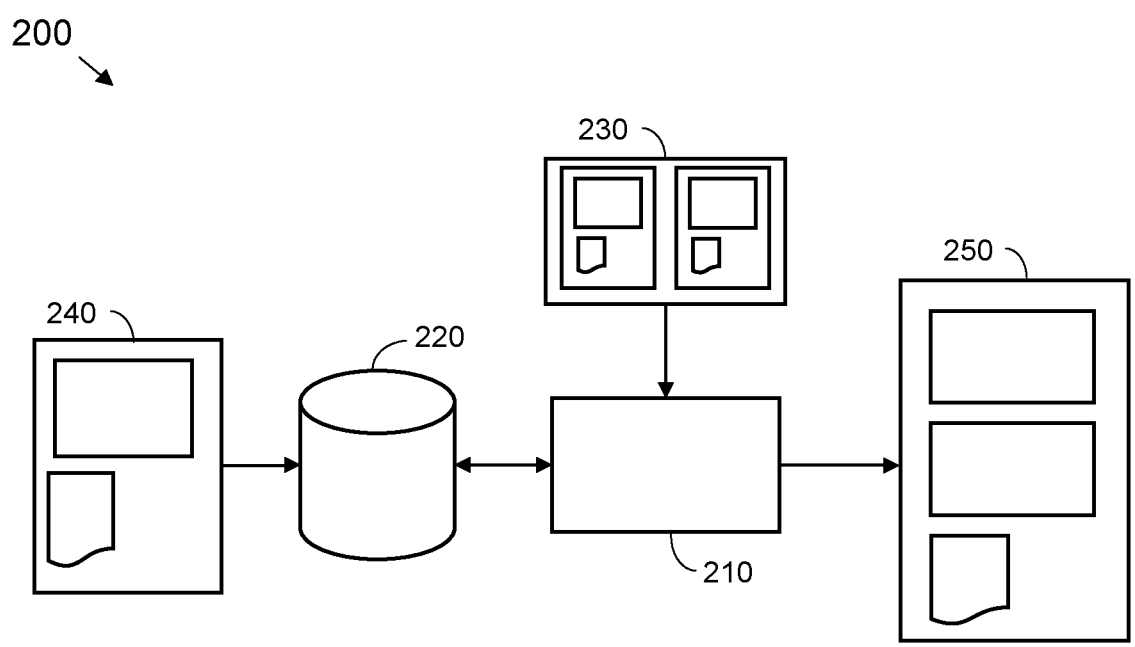
FIG. 2 is a schematic diagram showing an apparatus for a network, according to an example.

FIG. 2 is a schematic diagram showing an apparatus 200, according to an example. The apparatus 200 may be implemented with other apparatus and methods described herein. The apparatus 200 comprises an orchestrator management function 210. In examples, the deployment of a self-learning CL in the network is performed by the orchestrator management function 210.

The orchestrator management function 210 shown in FIG. 2, is communicatively coupled to a data storage 220. The data storage 220 stores implementations of subservices and their associated metadata, including both utility measurement subservices and automation subservices. The availability of subservices may be satisfied by the ability to acquire such data on-demand. For example, the data storage may be distributed or cloud-based and may not require data to be held on-premises.

The deployment of a self-learning CL commences on a request from an external entity such as a service provider or operator communicating with the orchestrator management function 210. Example. The request may comprise a representation 230 of the self-learning CL as a collection of automation subservices defined by objective and input domain metadata as shown in FIG. 1. The request may also specify one or more scope attributes.

The orchestrator management function 210 is arranged to identify, for each automation subservice of the representation 230, one or more utility measurement subservices 240 stored in the data storage 220 that are compatible with the respective automation subservice. The orchestrator management function 210 is arranged to deploy an instance 250 of the self-learning closed loop service based on the identification. The instance 250 comprises a pairing of each automation subservice of the self-learning closed loop service with the one or more compatible utility measurement subservices.

According to examples, orchestrator management function 210 may be arranged to identify utility measurement subservice dependencies of the self-learning CL. For example, the orchestrator management function 210 may list of utility measurement subservices that are needed to supply the incident rate to the CL's automation subservices of the self-learning subservice. The right utility measurement subservice for a given automation subservice may be identified by searching through all the utility measurement subservices stored in data storage 220 and comparing the metadata of each measurement subservice with that of the automation subservice.

On multiple potential matches between utility measurement subservices and automation subservices, the initiator of the deployment (e.g., the operator) may be presented with a choice option so that it can select a preferred implementation. In some cases, a choice of potential measurement subservices may be presented to an operator through a graphical user interface. The scope of two subservices may be aligned by the orchestrator management function 210 by deploying them to the same area.

Figure 3:
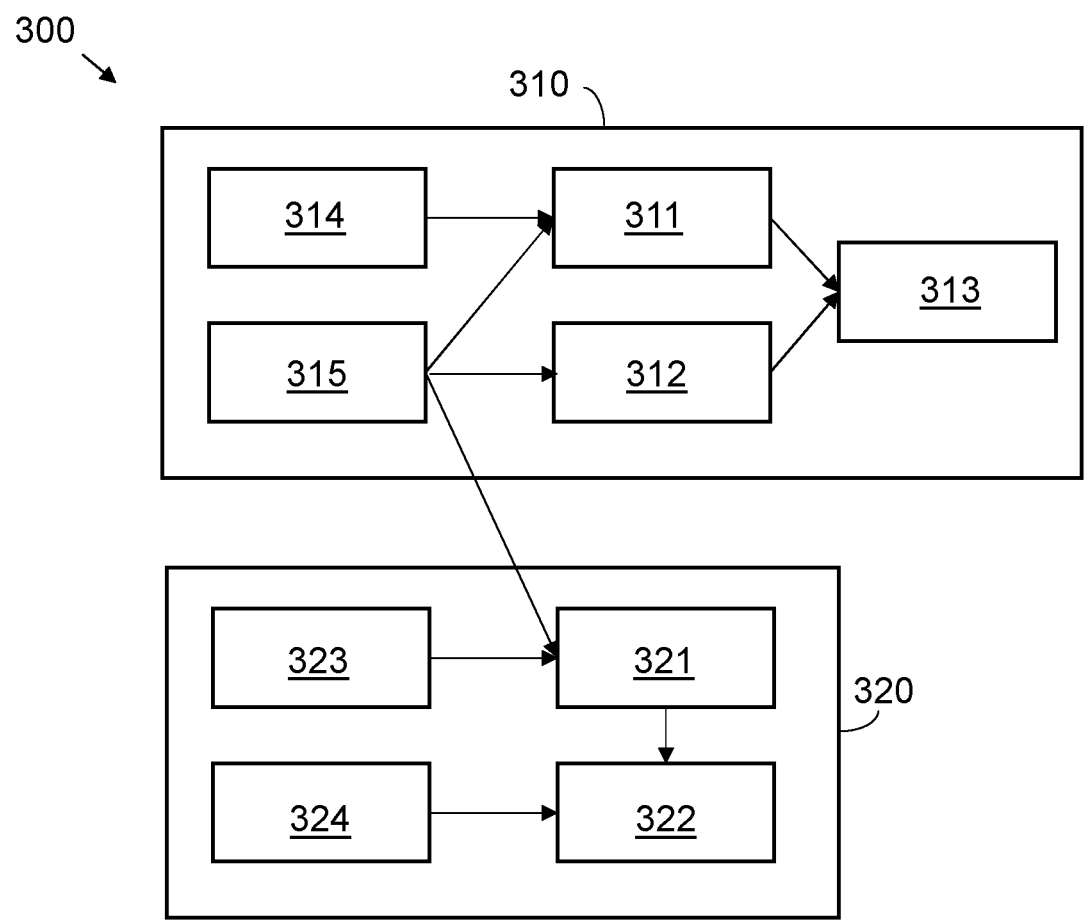
FIG. 3 is a schematic diagram showing an implementation of self-learning closed loops, according to an example.

FIG. 3 is a schematic diagram showing an implementation 300 of self-learning CLs, according to an example. The implementation 300 shown in FIG. 3 may include implementation of the methods and apparatus described herein. In particular, the deployment of self-learning CLs may be determined using the apparatus 200 shown in FIG. 2.

In FIG. 3, two self-learning CLs 310, 320 are shown and interdependencies between the subservices of the self-learning CLs 310, 320 are indicated by arrows. The self-learning CL 310 comprises automation subservices 311, 312 and 313. The automation subservice 313 receives input from automation subservices 311 and 312. The input may be in the form of data analytics or other information from these subservices. The automation subservice 311 is paired with utility measurement subservices 314 and 315. These measurement subservices may provide incident rate data to the automation subservice 311 which may be fed back into the automation subservice 311 to facilitate self-learning functions. Similarly the automation subservice 312 is paired with the utility measurement subservice 315.

The self-learning CL 329 comprises automation subservices 321 and 322. The automation subservice 322 receive input from the automation subservice 321. The automation subservice 321 is paired with the measurement subservice 323 and the measurement subservice 315 which is also used in the self-learning CL 310. The automation subservice 322 is paired with the utility measurement subservice 324.

Figure 4:
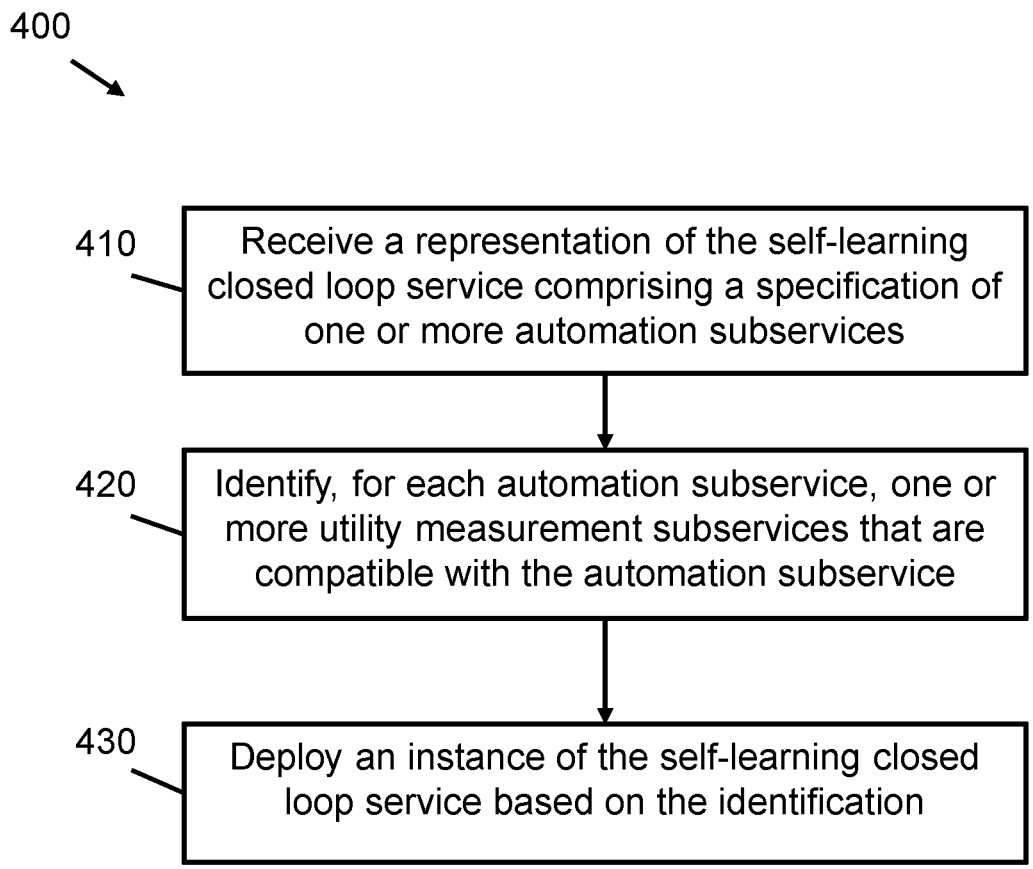
FIG. 4 is shows a flow diagram of a method for provisioning a self-learning closed loop, according to an example.

FIG. 4 shows a flow diagram of a method 400 for provisioning a self-learning closed loop service, according to an example. The method 400 shown in FIG. 4 may be implemented in conjunction with the other methods and apparatus described herein. In particular, the may be implemented by the apparatus 200 shown in FIG. 2.

At block 410 the method 400 comprises receiving a representation of the self-learning closed loop service where the representation comprising a specification of one or more automation subservices. For example, a representation such as the representation shown in FIG. 1 may be received by e.g. the orchestrator management function shown in FIG. 2.

At block 420, the method 400 comprises identifying, for each automation subservice of the representation, one or more utility measurement subservices that are compatible with the respective automation subservice. According to examples, identifying one or more compatible utility measurement subservices comprises receiving a representation of an automation subservice where the representation specifies attribute metadata of the automation subservice and identifying one or more compatible utility measurement subservices from a plurality of utility measurement subservices based on the attribute metadata of the automation subservice. The attribute metadata may comprise a first metadata specifying an automation objective of the automation subservice and a second metadata specifying an input domain associated to the automation subservice.

In some cases, identifying a compatible utility measurement subservice comprises identifying a utility measurement subservice having attribute metadata corresponding to the first and second metadata of the automation subservice. In some examples, the method 400 may comprise identifying a plurality of utility measurement subservice that are compatible with an automation subservice and selecting, from said plurality of utility measurement subservices, a subset of utility measurement subservices to pair with the automation subservice.

At block 430, the method 400 comprises deploying an instance of the self-learning closed loop service based on the identification. The instance comprises a pairing of each automation subservice of the self-learning closed loop service with one or more compatible utility measurement subservices.

Figure 5:
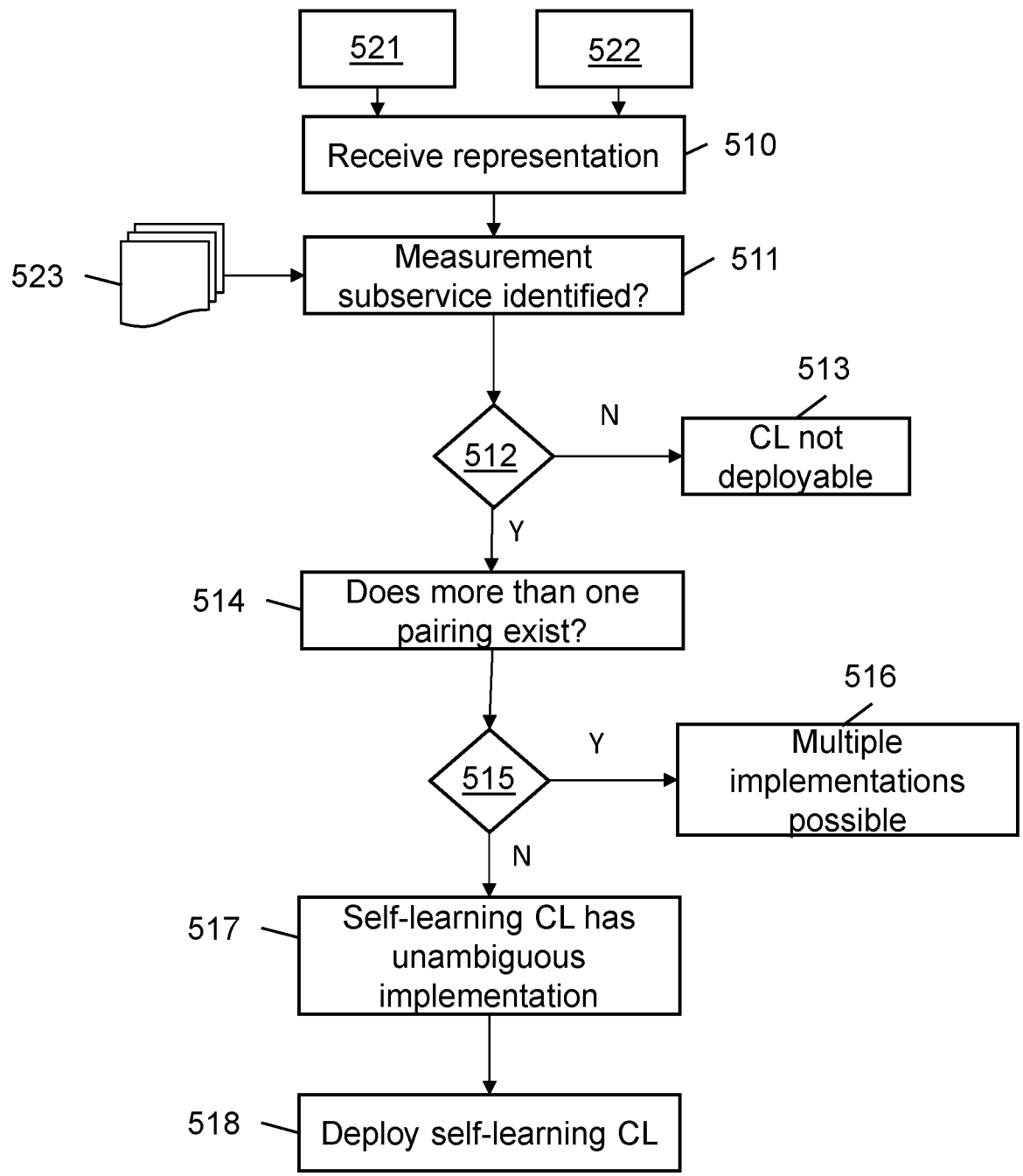
FIG. 5 is a flow diagram shows a flow diagram of a method for provisioning a self-learning closed loop, according to an example.

FIG. 5 shows a flow diagram of a method 500 for provisioning a self-learning closed loop service, according to an example. The method 500 shown in FIG. 5 may be implemented in conjunction with the other methods and apparatus described herein. In particular, the method 500 may be implemented by the apparatus 200 shown in FIG. 2 and in conjunction with the method 400 shown in FIG. 4.

At block 510, a representation of a self-learning closed loop service, represented by block 521 in FIG. 5, is received. A deployment scope 522 is also received. The representation 521 and deployment scope 522 may be communicated by an operator. At block 511, for each automation subservice a corresponding utility measurement subservice 523 having the same objective and input domain as the automation subservice is identified.

At block 512, if an automation subservice cannot be paired with a measurement subservice then, at block 513 the method 500 outputs a notification that the self-learning CL cannot be deployed. On the other hand, if each automation subservice can be paired with at least one utility measurement subservice, then the method 500 proceeds to block 514. At block 515, if an automation subservice can be paired with more than one measurement subservice then at block 516, the operator is notified that multiple implementation choices exist for the self-learning CL. Alternatively, at block 517 if each automation subservice may be paired with a single measurement subservice, then the self-learning CL has an unambiguous implementation. At block 518, the self-learning CL is deployed according to the unambiguous implementation.

The methods and systems described herein provide a coupling between measurement subservices and automation subservices that promotes an extendable marketplace where a growing variety of incident measurements can be implemented and published by different measurement subservices. This marketplace may be provided by a multitude of vendors, while exposing a uniform inform via the incident metric towards the automation subservices of self-learning CLs. This facilitates deployment of self-learning CLs across complex distributed systems by providing an improved and efficient framework for deployment.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. In some examples, some blocks of the flow diagrams may not be necessary and/or additional blocks may be added. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. Thus, modules of apparatus may be implemented by a processor executing machine-readable instructions stored in a memory, or a processor operating in accordance with instructions embedded in logic circuitry. The term 'processor' is to be interpreted broadly to include a CPU, processing unit, ASIC, logic unit, or programmable gate set etc. The methods and modules may all be performed by a single processor or divided amongst several processors.

Figure 6:
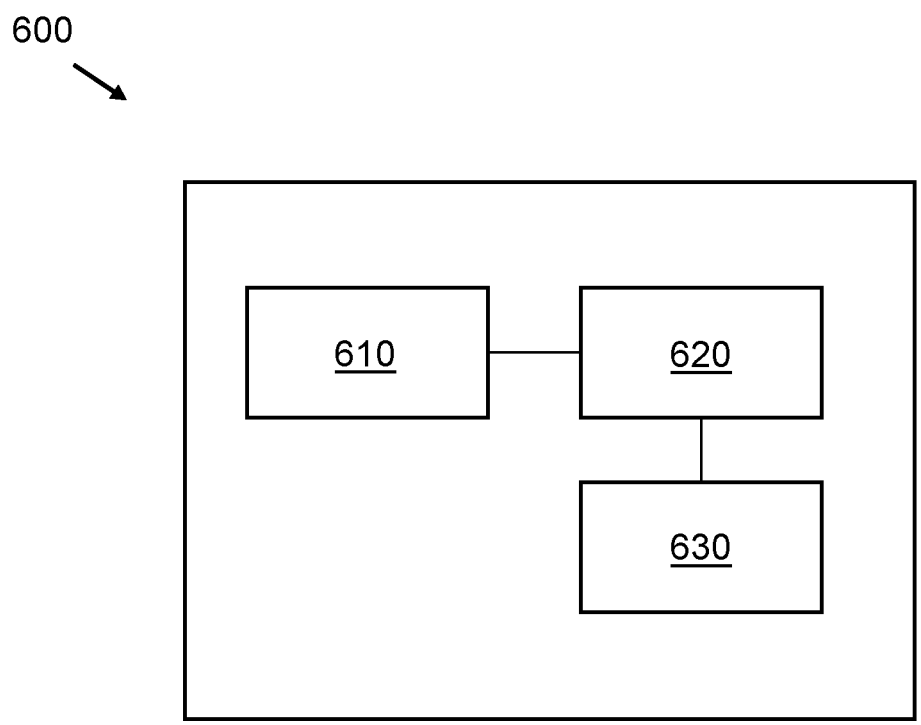
FIG. 6 shows a simplified schematic diagram of a computing system, according to an example.

Such machine-readable instructions may also be stored in a computer readable storage that can guide the computer or other programmable data processing devices to operate in a specific mode. FIG. 6 shows an example 600 of a processor 610 associated with a memory 620. The memory 620 comprises computer readable instructions 630 which are executable by the processor 610.

The instructions 630 cause the processor 610 to access a representation of the self-learning closed loop service, the representation comprising a specification of one or more automation subservices, identify, for each automation subservice of the representation, one or more utility measurement subservices that are compatible with the respective automation subservice and deploy an instance of the self-learning closed loop service based on the identification. The instance comprises a pairing of each automation subservice of the self-learning closed loop service with one or more compatible utility measurement subservices.

Such machine-readable instructions may also be loaded onto a computer or other programmable data processing devices, so that the computer or other programmable data processing devices perform a series of operations to produce computer-implemented processing, thus the instructions executed on the computer or other programmable devices provide an operation for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

The present inventions can be embodied in other specific apparatus and/or methods. The described embodiments are to be considered in all respects as illustrative and not restrictive. In particular, the scope of the invention is indicated by the appended claims rather than by the description and figures herein. All changes that come within the meaning and range of equivalency of the claims are to be embraced within their scope.

The invention claimed is:

1. A method comprising:
  receiving a representation of a self-learning closed loop service, the representation comprising a specification of one or more automation subservices;
  identifying, for individual ones of the one or more automation subservices of the representation, one or more utility measurement subservices that are compatible with the individual automation subservice, the identifying comprising:
    receiving a representation of the individual automation subservice, the representation specifying attribute metadata of the individual automation subservice; and
    identifying the compatible one or more utility measurement subservices from a plurality of utility measurement subservices based on the attribute metadata of the individual automation subservice; and
  deploying an instance of the self-learning closed loop service based on the identification,
  wherein the instance comprises a pairing of the individual ones of the one or more automation subservices of the self-learning closed loop service with the corresponding compatible one or more utility measurement subservices.

2. The method of claim 1, wherein the attribute metadata comprises first metadata specifying an automation objective of the individual automation subservice and second metadata specifying an input domain associated to the individual automation subservice.

3. The method of claim 2, wherein identifying the compatible one or more utility measurement subservices comprises identifying a utility measurement subservice having attribute metadata corresponding to the first and second metadata of the automation subservice.

4. The method of claim 1, comprising, for individual pairings of a utility measurement subservice with an automation subservice:
  evaluating, by the utility measurement subservice, a utility metric comprising an incident rate for a respective automation subservice, and
  communicating a utility measurement from the utility measurement subservice to the respective automation subservice based on the evaluation.

5. The method of claim 4, wherein the incident rate comprises a ratio of a number of negative events associated to the automation subservice to a total number of events.

6. The method of claim 4, wherein determining the utility metric comprises evaluating one or more of network, service, traffic, user, or user equipment performance.

7. The method of claim 1, wherein deploying the instance comprises providing a deployment area and deploying the instance across the deployment area.

8. The method of claim 7, wherein the deployment area comprises one or more of the following: a geographical region; a network slice; an area served by a vendor's equipment, services, or both the vendor's equipment and services; an administrative region; a set of network equipment having at least one of the following: a common version, vendor, capability, or generation; a user equipment type, a set of subscribers, or a user equipment type and the set of subscribers.

9. The method of claim 1, comprising:
  identifying a plurality of utility measurement subservices that are compatible with an automation subservice; and
  selecting, from said compatible plurality of utility measurement subservices, a subset of utility measurement subservices to pair with the automation subservice.

10. The method of claim 1, comprising generating data analytics by an automation subservice and communicating the data analytics to another automation subservice.

11. The method of claim 1, comprising identifying utility measurement subservice dependencies of the self-learning closed loop service based on the representation.

12. A non-transitory computer readable storage comprising program code that, when executed by at least one processor of an apparatus, causes the apparatus to perform at least the following:
  receiving a representation of a self-learning closed loop service, the representation comprising a specification of one or more automation subservices;
  identifying, for individual ones of the one or more automation subservices of the representation, one or more utility measurement subservices that are compatible with the individual automation subservice, the identifying comprising:
    receiving a representation of the individual automation subservice, the representation specifying attribute metadata of the individual automation subservice; and
    identifying the compatible one or more utility measurement subservices from a plurality of utility measurement subservices based on the attribute metadata of the individual automation subservice; and
  deploying an instance of the self-learning closed loop service based on the identification,
  wherein the instance comprises a pairing of the individual ones of the one or more automation subservices of the self-learning closed loop service with the corresponding compatible one or more utility measurement subservices.

13. An apparatus, the apparatus comprising:
  at least one processor; and
  at least one memory storing instructions that, when executed with the at least one processor, cause the apparatus to:
  receive a representation of a self-learning closed loop service, the representation comprising a specification of one or more automation subservices;
  identify, for individual ones of the one or more automation subservices of the representation, one or more utility measurement subservices that are compatible with the individual automation subservice, the identifying comprising:

receiving a representation of the individual automation subservice, the representation specifying attribute metadata of the individual automation subservice; and identifying the compatible one or more utility measurement subservices from a plurality of utility measurement subservices based on the attribute metadata of the individual automation subservice; and deploy an instance of the self-learning closed loop service based on the identification, wherein the instance comprises a pairing of the individual ones of the one or more automation subservices of the self-learning closed loop service with the corresponding compatible one or more utility measurement subservices.

14. The apparatus of claim 13, wherein the attribute metadata comprises first metadata specifying an automation objective of the individual automation subservice and second metadata specifying an input domain associated to the individual automation subservice.

15. The apparatus of claim 14, wherein identifying the compatible one or more utility measurement subservices comprises identifying a utility measurement subservice having attribute metadata corresponding to the first and second metadata of the automation subservice.

16. The apparatus of claim 13, wherein the at least one memory stores instructions that, when executed with the at least one processor, causes the apparatus to: for individual pairings of a utility measurement subservice with an automation subservice:

evaluating, by the utility measurement subservice, a utility metric comprising an incident rate for a respective automation subservice, and communicating a utility measurement from the utility measurement subservice to the respective automation subservice based on the evaluation.

17. The apparatus of claim 13, wherein deploying the instance comprises providing a deployment area and deploying the instance across the deployment area.

18. The apparatus of claim 17, wherein the deployment area comprises one or more of the following: a geographical region; a network slice; an area served by a vendor's equipment, services, or both the vendor's equipment and services; an administrative region; a set of network equipment having at least one of the following: a common version, vendor, capability, or generation; a user equipment type, a set of subscribers, or a user equipment type and the set of subscribers.

19. The apparatus of claim 13, wherein the at least one memory stores instructions that, when executed with the at least one processor, causes the apparatus to:

identifying a plurality of utility measurement subservices that are compatible with an automation subservice; and selecting, from said compatible plurality of utility measurement subservices, a subset of utility measurement subservices to pair with the automation subservice.

20. The apparatus of claim 13, wherein the at least one memory stores instructions that, when executed with the at least one processor, causes the apparatus to: identifying utility measurement subservice dependencies of the self-learning closed loop service based on the representation.

* * * * *